Figure 1:
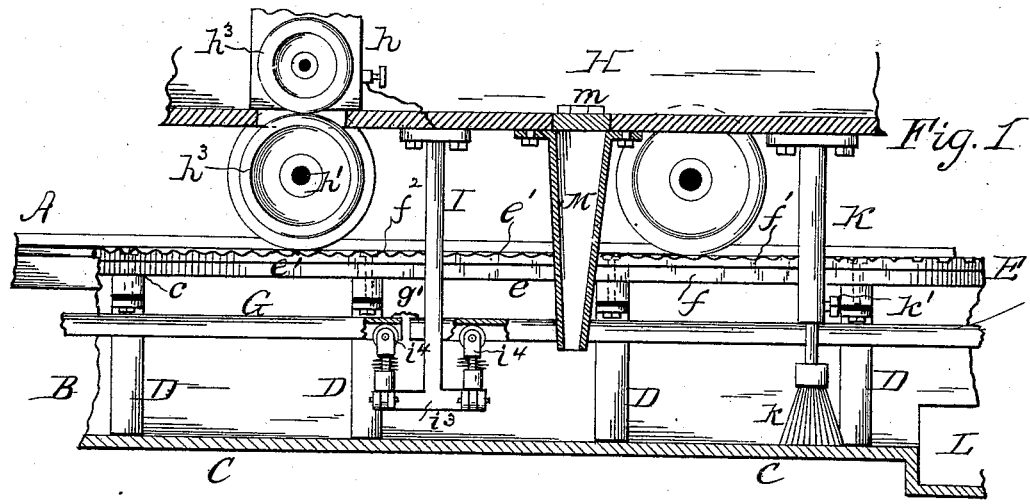

(No Model.)

B. BIDWELL.
CONDUIT ELECTRIC RAILWAY.

No. 504,549. Patented Sept. 5, 1893.

WITNESSES:
C. W. Williams
Chas. A. Rutter.

INVENTOR:
Benson Bidwell
By S. J. Van Stavoren
ATTORNEY

UNITED STATES PATENT OFFICE.

BENSON BIDWELL, OF PHILADELPHIA, PENNSYLVANIA, ASSIGNOR, BY MESNE ASSIGNMENTS, OF ONE-HALF TO BENSON BIDWELL, TRUSTEE.

CONDUIT ELECTRIC RAILWAY.

SPECIFICATION forming part of Letters Patent No. 504,549, dated September 5, 1893.

Application filed September 4, 1884. Serial No. 142,163. (No model.)

*To all whom it may concern:*

Be it known that I, BENSON BIDWELL, a citizen of the United States, residing at Philadelphia, in the county of Philadelphia and State of Pennsylvania, have invented certain new and useful Improvements in Electric Railways, of which the following is a specification, reference being had therein to the accompanying drawings.

My invention has relation to electric railways of the form comprising a slotted conduit in which are located fixed electrical conductors fed by a generator located at a station or stations along the line of way, and an electrically propelled vehicle having current-collector traveling therewith, extending into the conduit through its slot, and provided with brushes or rollers having contact with the fixed conductors to place the motor on the car, in a loop circuit from said conductors; and it has for its objects to provide a form of fixed conductors which protects the contact surface from dirt, rain or moisture entering or dripping into the conduit, and permits the contact-brushes to be readily removed at any point in the travel of the collector, and also of their movement laterally, independently of the current collector, for preventing damage to said brushes and the breaking or impairment of the continuity of the contact between the brushes and the conductors; to provide an upward spring-pressure for the contacts on the current-collector in addition to their lateral movement; to provide a conduit which affords easy access to its interior for repairing, testing or other purposes; to provide the current collector with upward spring pressure brushes constructed to maintain continuity of contact with the fixed conductors in passing over joints or other breaks in the latter; to provide the car with brushes for cleansing the bottom of the conduit; and with devices for admitting of salting or of introducing other suitable material into the conduit for melting snow or ice formed therein, whereby an economical, efficient and durable railway system having electrically propelled cars is secured.

My invention accordingly consists of the combination, construction and arrangement of parts as hereinafter described and claimed, having reference particularly to a line circuit or conductor composed of metal plates of segmental, dish-shaped or open bottom in cross-section, which dish-shape does not extend over a half circle and having an internal contact surface turned downward; to an electrically propelled vehicle having a current collector provided with contact-brushes having a lateral movement upon and also an upwardly acting pressure against the conductors in a slotted conduit; to a tube depending from the car into the conduit for feeding salt thereto; to an adjustable sweeping brush likewise depending from the car into the conduit; to a conduit having removable slotted cover composed of two longitudinal sections each made up of a metal plate having its upper surface roughened and a bottom plate of elastic and electric non-conducting material bolted to the conduit.

Figure 2:
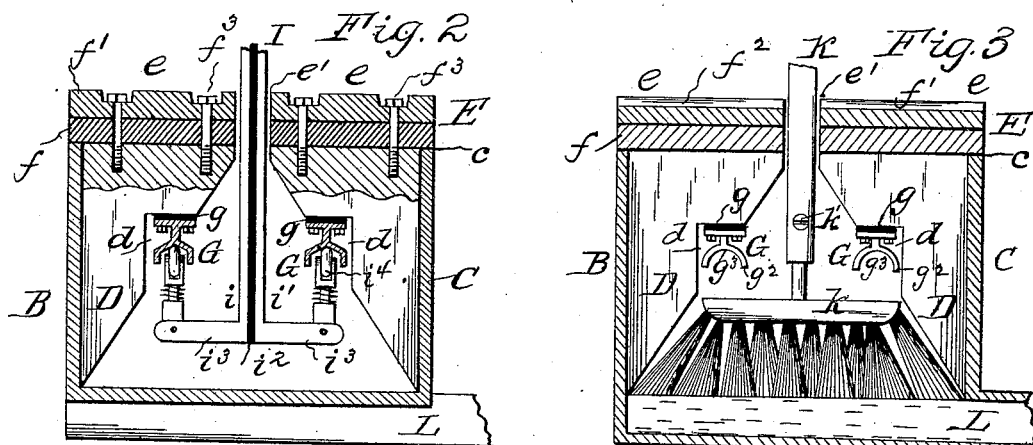
Figure 3:
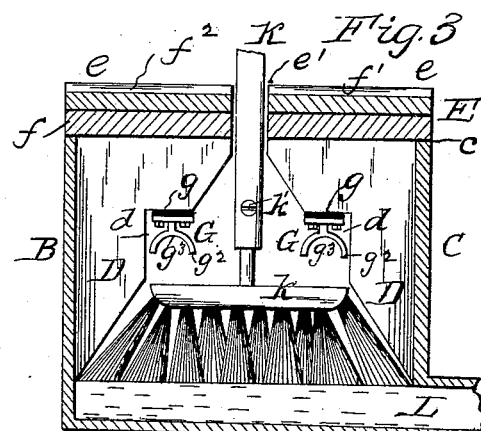
Figure 4:
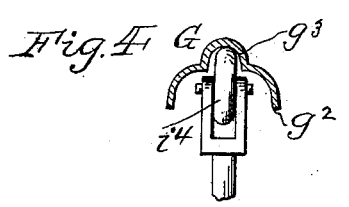
Figure 5:
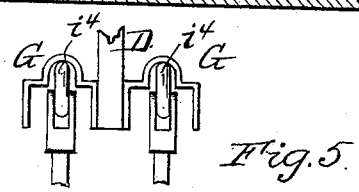

Reference is had to the accompanying drawings wherein Figure 1, represents a longitudinal section of part of a car, line of way and slotted conduit embodying my improvements; Fig. 2, a transverse section of conduit and conductors and an elevation of the contact plow; Fig. 3, a like view showing adjustable brush in elevation; and Figs. 4, 5, and 6 are detail sectional views of modified forms of open bottom conductors.

A represents the track rails of a street or other railway between which is located a slotted conduit B. The latter is composed of sections C C which are oblong, square or otherwise suitably configured in cross-section and having internal brackets D D formed integral therewith, or screwed or otherwise fastened in the conduits as desired. The sections C and brackets D are preferably of metal but other material as desired may be used for the same. These sections are open at their tops $c$ and the upper sides of the brackets are shown as preferably flush with the upper edges of the sections. The top parts of oppositely located brackets preferably approach each other and upon them and the top of the conduit are placed removable covers E composed of longitudinal plates $e$ $e$ separated by a central slot $e'$ as shown. The slot $e'$ may be of any desired width and each cover plate $e$ is composed preferably of a bottom strip of wood or other elastic and electric non-conducting material $f$ and a top strip of metal or other durable material $f'$ suitably corrugated or roughened as shown at $f^2$ to prevent horses slipping upon said plates when traveling on or over the same. The strips $f$ not only serve as electric insulation but also as a cushion for relieving or taking up the impact of the horses' feet upon the plates $e$. These strips $f$ and $f'$ are fastened to each other and to the conduit sections by bolts $f^3$ to provide the sections C with removable caps or covers for affording easy access to the conduit without necessitating digging up of the roadway.

Upon the brackets D are preferably secured the conductors G suitably insulated from the former as shown at $g$. The conductors are in sections and the joints between the sections are electrically made by wires $g'$ or otherwise as desired. These conductors are therefore fixed in the conduit and are fed by or are in circuit with an electric generator located at stations along the line of way, as fully shown and described in an application filed by me on the 14th day of August, 1884, and Serial No. 140,514.

Figure 6:
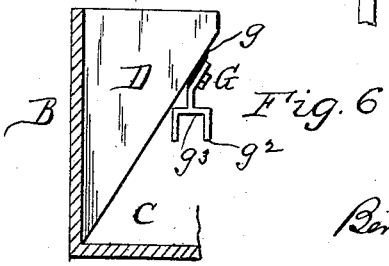

If desired the brackets D may be cut away as shown at $d$ Figs. 2 and 3, to accommodate conductors G so that they will not project into the vertical plane of the conduit slot, or, such result may be obtained without breaking the outline of the brackets as illustrated in Fig. 6. The conductors G are in cross section made in the form of a segment of a circle preferably, or, are dish-shaped not extending over half a circle and have side or depending edge flanges $g^2$ so that they have wide open bottoms, and this configuration may be plain or regular as indicated in Fig. 3, or irregular as shown in Fig. 4, or angular or otherwise as represented in Figs. 2 and 6. They are fixed in the conduit with their open bottoms underneath or turned down so as to present their inner or bottom surfaces $g^3$ for electrical contact with the contact points of the current collector as hereinafter described. This arrangement of, as well as, the form of the conductors, of themselves prevent dirt, rain or other foreign substances gaining access to the contact surfaces of the conductors, and any moisture deposited thereon drips off so that clean or good contact surfaces are always presented by the conductors to the contact points or brushes on the current collector. The wide open bottom of the conductor admits of removing the collector contacts or brushes from the conductors at any point in the travel of the collectors and also of said contacts or brushes moving laterally in the conductors when the collector sways or moves laterally, and hence wrenching, twisting or breaking off of the brushes or contacts from the collector is avoided.

H represents a part of a car of the usual or any suitable construction which is electrically propelled by a motor $h$ in gear with one of the car axles $h'$ by suitable friction gear $h^3$ or other connection between the motor shaft and axles may be used as desired. Traveling with the car is a current collector I which depends into the conduit through its slot $e$ and is provided with laterally moving and upwardly acting pressure brushes or rollers $i^4$ for contact with the bottom surfaces of the conductors.

The current collector may be constructed as desired but I have shown it composed of two parts $i$ and $i'$ suitably insulated from one another as indicated at $i^2$ and each provided with lower ends $i^3$ preferably bifurcated, to each of which is pivoted or hinged, by a longitudinal axis, an arm or plate having a socket for the reception of a contact-brush or roller $i^4$ which has a spiral spring support so arranged as to preferably impart to the contact brush an upward spring pressure against the conductor contact surfaces. Each contact roller or brush therefore has a separate vertical pressure and a transverse yielding motion of its own about a longitudinal axis to admit of it independently yielding or accommodating itself to the vertical and lateral vibrations of the car or collector, for maintaining the desired continuity of contact between them and the conductors while subject to said vibrations and these yielding motions of the contact brushes being independent of the collector admit of them compensating for or yielding both to the unevenness in the conductors and in the road-bed to maintain a good contact between the brushes and the conductors as the collector travels along in the conduit, irrespective of any inequalities of alignment of the conductors and condition of service of the road. There are as will be noted two brushes $i^4$ for each conductor and these brushes are separated from one another so as to bridge the joints of the conductor sections and maintain continuity of contact as the collector travels through the conduit. Traveling with the car is another depending arm K extending through the slot $e'$ into the conduit. This arm is provided with a sweeping brush $k$ which is vertically adjustable upon arm K' and held in its adjusted position by set screw $k'$, or said parts may be otherwise constructed as desired. The brush K may be located in advance of the contact plow or otherwise as desired, so that as the car travels along the brush $k$ sweeps the bottom of the conduit to keep it clean. The dirt swept is, by the brush, conveyed to lateral conduits L leading to the street gutters or preferably to the sewers.

From the car depends a funnel or tube M having a trap door or other opening $m$. This tube depends into the conduit through its slot and is used to convey salt or other material to the conduit from the car for melting snow or ice formed on entering the conduit.

The feeding fixed conductors G instead of being secured to separate lines of brackets D may both be attached to the same line of brackets or supports as shown in Fig. 5, in which case the support is made of wood or other insulating material.

The oblong or square form of conduit described having interval brackets on each side, affords a strong construction of conduit which will not readily yield to the action of frost to close the slot $e'$ but, if it is more or less closed by lateral pressure, it is readily opened to its normal width by adjusting the plates $e\ e$ laterally and these plates being located along the entire line, serve as man-holes at any desired point.

As it is obvious that the construction of the foregoing described parts comprising my invention as hereinafter claimed may be varied without departing from the spirit of the same I do not wish to be understood as confining myself to any one particular construction therefor.

What I claim is—

1. In an electric railway the combination of a conduit having an open top, internal brackets secured to opposing vertical sides of the conduit and having their upper ends flush with the top of the conduit, stationary conductor-sections secured to and supported by said brackets, and a slotted cover composed of two removable sections bolted to said conduit, substantially as set forth.

2. In an electric railway the combination of a metallic conduit having an open top and closed sides and bottom, internal side brackets flush with the top of the conduit, conductors secured to and wholly supported by said brackets, and a slotted cover bolted to the brackets, substantially as shown and described.

3. The conduit B composed of sections and each section having closed bottom and sides and slotted removable top E composed of plates each made up of a strip of insulating material and a strip of metal bolted together and to the conduit sections, substantially as and for the purpose set forth.

4. The metal conduit B having a slotted removable cover, composed of a top-plate made up of a strip of metal having its upper surface roughened or corrugated to form part of the street or road-surface, and of a lower strip of insulating material bolted together and to the conduit, substantially as set forth.

5. In an electric railway the combination of conduit B having a slotted cover and internal brackets, conductor sections G secured to said brackets and having open bottom contact surfaces which do not extend over a half of a circle, an electrically propelled car and a current collector traveling with the car, extending into the conduit, and having contact pieces which have a yielding contact with the bottom of the conductors, substantially as set forth.

6. The conduit B having open top $c$, brackets D, slotted removable cover E composed of separate plates each made up of strips $f f'$ of different materials bolted together and to the brackets, substantially as shown and described.

7. In an electric railway a metallic line circuit composed of metal plates of segmental or dish shaped form in cross section which do not extend over half a circle and have internal contact surfaces, and are suitably supported with their open bottoms or internal contact-surfaces turned downward, substantially as set forth.

8. In an electric railway the combination with a metallic line circuit composed of conductors of segmental or dish shaped form in cross-section which do not extend over half a circle and have internal contact surfaces, of an electrically propelled car having a current collector traveling therewith, and contact pieces on the collector for electrical contact with the bottom surfaces of the conductors and having vertically and laterally yielding motion, as and for the purpose set forth.

9. In an electric railway the combination of a conduit B having slot $e'$, conductors G having open bottoms, an electrically propelled car having a current collector extending into the conduit and provided with hinged arms projecting toward the conductors and supporting contacts $i^4$ which have a spring pressure toward the conductors, substantially as set forth.

10. In an electric railway, the combination of a conduit having stationary conductors, an electrically propelled car having traveling connections I terminating in laterally projecting ends $i^3$ pivoted or hinged spring bearings on ends $i^3$ and contacts $i^4$ on said spring bearings substantially as set forth.

11. In an electric railway the conduit B having slot $e'$ a lateral conduit L and a car having a funnel or pipe M for feeding salt or like material to said conduit, substantially as set forth.

12. In an electric railway, a slotted conduit having branch conduits L in combination with an electrically propelled car having an adjustable brush $k$, substantially as and for the purpose set forth.

13. The combination of an electrically propelled vehicle, a slotted conduit having a fixed conductor, and a current collector traveling with the vehicle and having hinged or pivoted bars or plates, and upward spring pressure brushes on said plates for contact with said conductors, substantially as and for the purpose set forth.

In testimony whereof I affix my signature in presence of two witnesses.

BENSON BIDWELL.

Witnesses:
JOHN RODGERS,
S. J. VAN STAVOREN.

Correction in Letters Patent No. 504,549.

It is hereby certified that Letters Patent No. 504,549, granted September 5, upon the application of Benson Bidwell, of Philadelphia, Pennsylvania, for an improv ment in "Conduit Electric Railways," was erroneously issued to said Benson Bidwe inventor, and Benson Bidwell, trustee, as assignee of one-half interest in said inve tion; whereas the patent should have been granted to said *Benson Bidwell*, he be sole owner of the entire interest; and that the said Letters Patent should be read v this correction therein that the same may conform to the record of the case in Patent Office.

Signed, countersigned, and sealed this 5th day of January, A. D., 1897.

[SEAL.]

JNO. M. REYNOLDS,
*Assistant Secretary of the Interior.*

Countersigned:
  John S. Seymour,
    *Commissioner of Patents.*